United States Patent
Chen et al.

(10) Patent No.: US 11,050,371 B2
(45) Date of Patent: Jun. 29, 2021

(54) BRUSHLESS DIRECT-CURRENT MOTOR USING SINGLE WIRE TO TRANSMIT INFORMATION OF POSITIONS OF A PLURALITY OF MAGNETS

(71) Applicant: LINGDONG TECHNOLOGY (BEIJING) CO. LTD, Beijing (CN)

(72) Inventors: Zhaoqiang Chen, Beijing (CN); Qingsong Yang, Beijing (CN); Pei Ruan, Beijing (CN); Guorong Ren, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 7 days.

(21) Appl. No.: 16/616,497

(22) PCT Filed: Dec. 7, 2018

(86) PCT No.: PCT/CN2018/119733
§ 371 (c)(1),
(2) Date: Nov. 25, 2019

(87) PCT Pub. No.: WO2020/113550
PCT Pub. Date: Jun. 11, 2020

(65) Prior Publication Data
US 2020/0358379 A1 Nov. 12, 2020

(51) Int. Cl.
*H02P 6/15* (2016.01)
*H02P 6/16* (2016.01)
(Continued)

(52) U.S. Cl.
CPC ............... *H02P 6/16* (2013.01); *H02K 29/08* (2013.01); *H02P 6/28* (2016.02); *H02P 29/0241* (2016.02); *H02P 2201/11* (2013.01)

(58) Field of Classification Search
CPC .......... H02P 6/16; H02P 6/28; H02P 29/0241; H02P 2201/11; H02P 6/153; H02K 29/08
See application file for complete search history.

(56) References Cited

U.S. PATENT DOCUMENTS

2004/0080290 A1* 4/2004 Hill ........................... G01P 3/48
318/400.04
2017/0214341 A1* 7/2017 Matthews ............... H02P 6/153

FOREIGN PATENT DOCUMENTS

CN 202856672 U 4/2013
CN 103401488 A 11/2013
(Continued)

*Primary Examiner* — Cortez M Cook
(74) *Attorney, Agent, or Firm* — Winston Hsu

(57) ABSTRACT

A brushless direct-current (BLDC) motor has a connector, a stator, a rotor and a positioning module. The connector has three input ends for receiving three voltage signals, and a feedback end for receiving a feedback signal. The three voltage signals are transmitted to three windings of the stator. Rotation of the rotor is induced by interaction of magnetic fields of the three windings and a plurality of magnets of the rotor. The positioning module is fixed to the stator and has three Hall sensors for sensing positions of the magnets. The positioning module generates the feedback signal according to the positions of the plurality of magnets sensed by the three Hall sensors. The first voltage signal, the second voltage signal and the third voltage signal are adjusted according to the feedback signal.

17 Claims, 9 Drawing Sheets

(51) Int. Cl.
    *H02P 6/28*     (2016.01)
    *H02P 29/024*     (2016.01)
    *H02K 29/08*     (2006.01)

(56) References Cited

FOREIGN PATENT DOCUMENTS

| | | |
|---|---|---|
| CN | 203574577 U | 4/2014 |
| CN | 105322845 A | 2/2016 |
| JP | 2003154187 A | 5/2003 |

\* cited by examiner

BRUSHLESS DIRECT-CURRENT MOTOR USING SINGLE WIRE TO TRANSMIT INFORMATION OF POSITIONS OF A PLURALITY OF MAGNETS

BACKGROUND OF THE INVENTION

1. Field of the Invention

The present invention is related to a brushless direct-current (BLDC) motor, and more particularly, to a brushless direct-current (BLDC) motor using a single wire to transmit information of positions of a plurality of magnets.

2. Description of the Prior Art

Brushless direct-current electric (BLDC) motors are synchronous motors powered by DC electricity via a switching power supply which produces an AC electric current to drive each phase of the motor via a closed loop controller. FIG. 1 shows electronic connections of a BLDC motor 100 and a controller 190 of a motor system 10 according to the prior art. The controller 190 is electronically connected to the motor 100 via eight wires 121 to 128 to control the operations of the motor 100. The motor 100 comprises three windings W1, W2 and W3 and three Hall sensors 111, 112 and 113. The controller 190 provides three voltage signals U, V and W to the three windings W1, W2 and W3 via the wires 121, 122 and 123 respectively to control the speed and torque of the motor 100. The Hall sensors 111, 112 and 113 sense the positions of magnets of the motor 100 and generate three position signals Ha, Hb and Hc based on the sensed positions of magnets of the motor 100. The controller 190 receives the position signals Ha, Hb and Hc via the wires 125, 126 and 127 and adjusts the three voltage signals U, V and W according to the position signals Ha, Hb and Hc so as to control the speed and torque of the motor 100. The controller 190 also provides a power supply voltage VCC to the Hall sensors 111, 112 and 113 via the wire 124, and provides a ground voltage GND to the Hall sensors 111, 112 and 113 via the wire 128. However, the number of the wires 121 to 128 connecting the controller 190 and the motor 110 is excessive. As a result, when the motor system 10 is used in a motorized suitcase, it is not easy to contain all of the eight wires 121 to 128 to a small-sized wheel of the motorized suitcase, which is equipped with and driven by the motor 100, while the controller 190 is not installed in the small-sized wheel of the motorized suitcase.

SUMMARY OF THE INVENTION

One embodiment of the present invention discloses a brushless direct-current (BLDC) motor. The BLDC motor comprises a connector, a stator, a rotor and a positioning module. The connector comprises a first input end for receiving a first voltage signal, a second input end for receiving a second voltage signal, a third input end for receiving a third voltage signal, and a feedback end for receiving a feedback signal. The first voltage signal, the second voltage signal and the third voltage signal are adjusted according to the feedback signal. The stator comprises a first winding for receiving the first voltage signal, a second winding for receiving the second voltage signal, and a third winding for receiving the third voltage signal. The rotor comprises a plurality of magnets. Rotation of the rotor is induced by interaction of magnetic fields of the first winding, the second winding, the third winding and the plurality of magnets. The positioning module is fixed to the stator and comprises three Hall sensors for sensing positions of the plurality of magnets. The positioning module is used to generate the feedback signal according to the positions of the plurality of magnets sensed by the three Hall sensors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
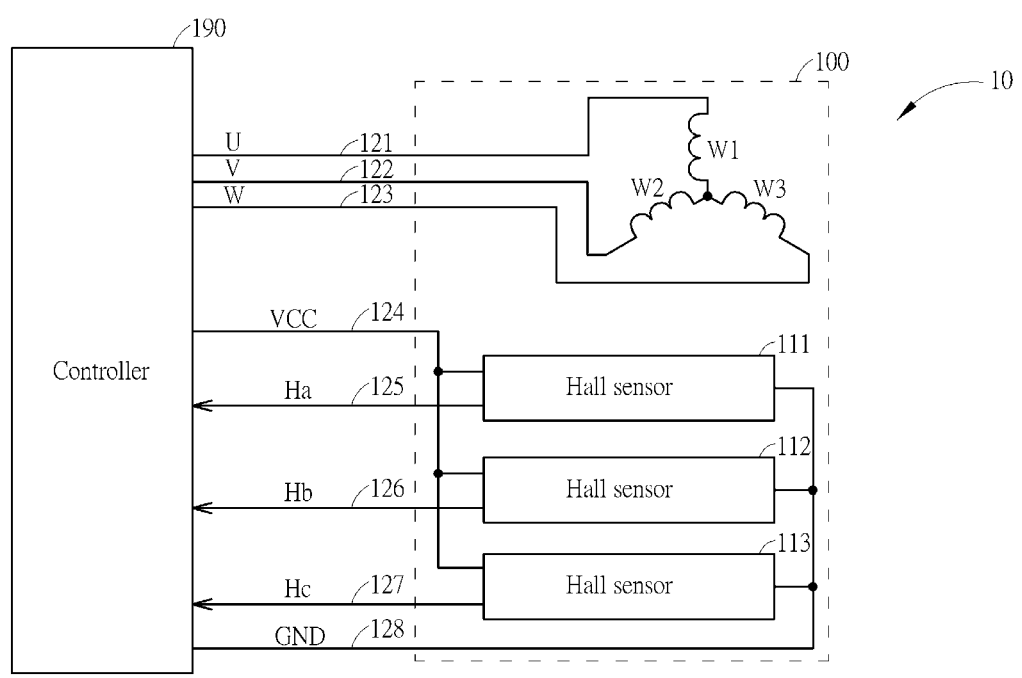
FIG. 1 shows electronic connections of a brushless direct-current (BLDC) motor and a controller of a motor system according to the prior art.
Figure 2:
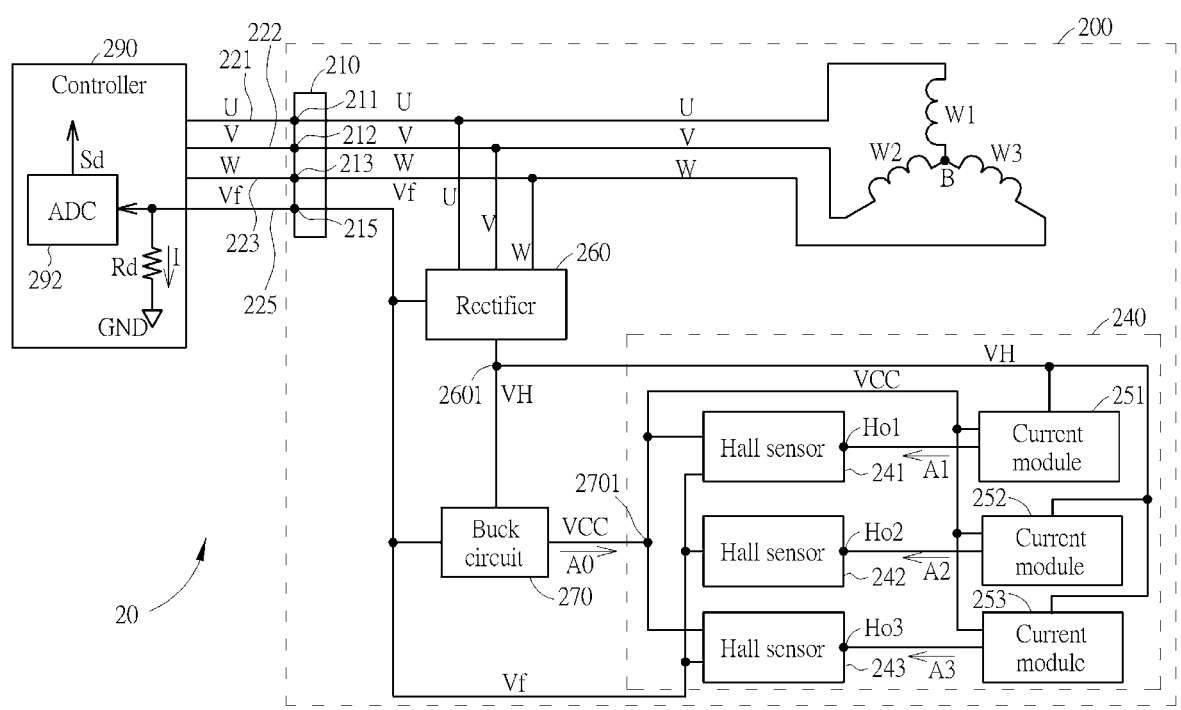
FIG. 2 shows electronic connections of a BLDC motor and a controller of a motor system according to an embodiment of the present invention.

Please refer to FIG. 2. FIG. 2 shows electronic connections of a brushless direct-current (BLDC) motor 200 and a controller 290 of a motor system 20 according to an embodiment of the present invention. The BLDC motor 200 comprises a connector 210 and a positioning module 240. The connector 210 comprises a first input end 211 for receiving a first voltage signal U, a second input end 212 for receiving a second voltage signal V, a third input end 213 for receiving a third voltage signal W, and a feedback end 215 for receiving a feedback signal Vf. The controller 290 transmits the first voltage signal U, the second voltage signal V and the third voltage signal W to the first end 211, the second end 212 and the third end 213 of the connector 210 via wires 221, 222 and 223 respectively and receives the feedback signal Vf from the feedback end 215 via a single wire 225.

Figure 3:
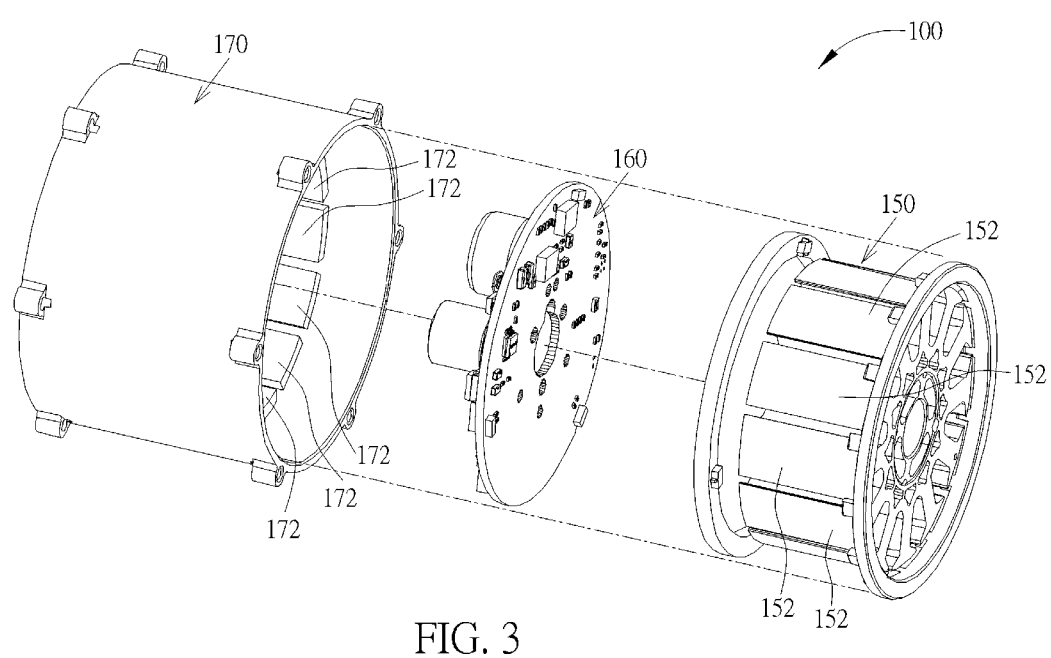
FIG. 3 is an explosion diagram of the BLDC motor in FIG. 2.
Figure 4:
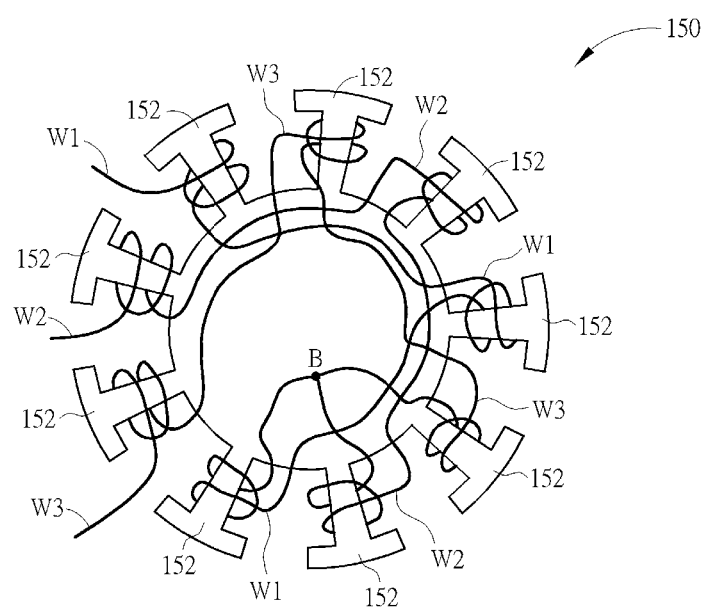
FIG. 4 is an upper view of a stator of the BLDC motor in FIG. 3.

Please refer to FIGS. 2 to 4. FIG. 3 is an explosion diagram of the BLDC motor 200 in FIG. 2. FIG. 4 is an upper view of a stator 150 of the BLDC motor 200 in FIG. 3. The BLDC motor 200 further comprises the stator 150, a circuit board 160 and a rotor 170. The circuit board 160 is fixed to the stator 150 and is used to mechanically support and electrically connect electronic components (e.g., the positioning module 240) of the BLDC motor 200. In general, when the BLDC motor 200 operates, the stator 150 and the circuit board 160 are static and the rotor 170 rotates around the stator 150. The stator 150 comprises three windings W1, W2 and W3 and a plurality of pole shoes 152. The windings W1, W2 and W3 have a joint point B and are respectively wound on the pole shoes 152 in a specific order, as shown in FIG. 4. Exemplarily, the coil number of each pole shoe 152 is two. However, the present invention is not limited thereto. The coil number of each pole shoe 152 may be an integer greater than two. Moreover, the total number of the pole shoes 152 is nine. However, the present invention is not limited thereto. The total number of the pole shoes 152 could be an integer which is several times of the total number of the windings of the stator 150 (e.g., 6, 12, 15, etc.). The rotor 170 comprises a plurality of magnets 172 fixed on an inner surface of the rotor 170. Rotation of the rotor 170 is induced by interaction of magnetic fields of the windings W1, W2 and W3 and the magnets 172.

Please refer to FIG. 2, again. The controller 290 provides the three voltage signals U, V and W to the three windings W1, W2 and W3 of the BLDC motor 200 to control the speed and torque of the BLDC motor 200. In addition, the positioning module 240 comprises three Hall sensors 241, 242 and 243 fixed on the circuit board 160 for sensing positions of the plurality of magnets 172. The positioning module 240 generates the feedback signal Vf according to the positions of the plurality of magnets 172 sensed by the three Hall sensors 241, 242 and 243. Therefore, the controller 290 could adjust the three voltage signals U, V and W according to the feedback signal Vf so as to control the speed and torque of the BLDC motor 200.

As compared with the motor system 10 of the prior art, the motor system 20 only uses four wires 221, 222, 223 and 225 to electrically connect the BLDC motor 200 to the controller 290, and the BLDC motor 200 uses a single wire 225 to transmit information of positions of the plurality of magnets 172 to the controller 290. Therefore, when the motor system 20 is used in a motorized suitcase, it would be easier to contain all of the four wires 221, 222, 223 and 225 to a small-sized wheel of the motorized suitcase, which is equipped with and driven by the BLDC motor 200, while the controller 290 is not installed in the small-sized wheel of the motorized suitcase.

In an embodiment of the present invention, the BLDC motor 200 further comprises a rectifier 260 and a buck circuit 270. The rectifier 260 is configured to rectify the first voltage signal U, the second voltage signal V and the third voltage signal W to output a first power supply voltage VH to a first power supply node 2601. The buck circuit 270 is coupled between the first power supply node 2601 and the feedback end 215 and is configured to generate a second power supply voltage VCC based on the first power supply voltage VH. The second power supply voltage VCC is less than the first power supply voltage VH (e.g., VCC is about 5 volts and VH is about 24 volts), and the second power supply voltage VCC and a quiescent current A0 are outputted to a second power supply node 2701. The magnitude of quiescent current A0 is a constant value.

Figure 5:
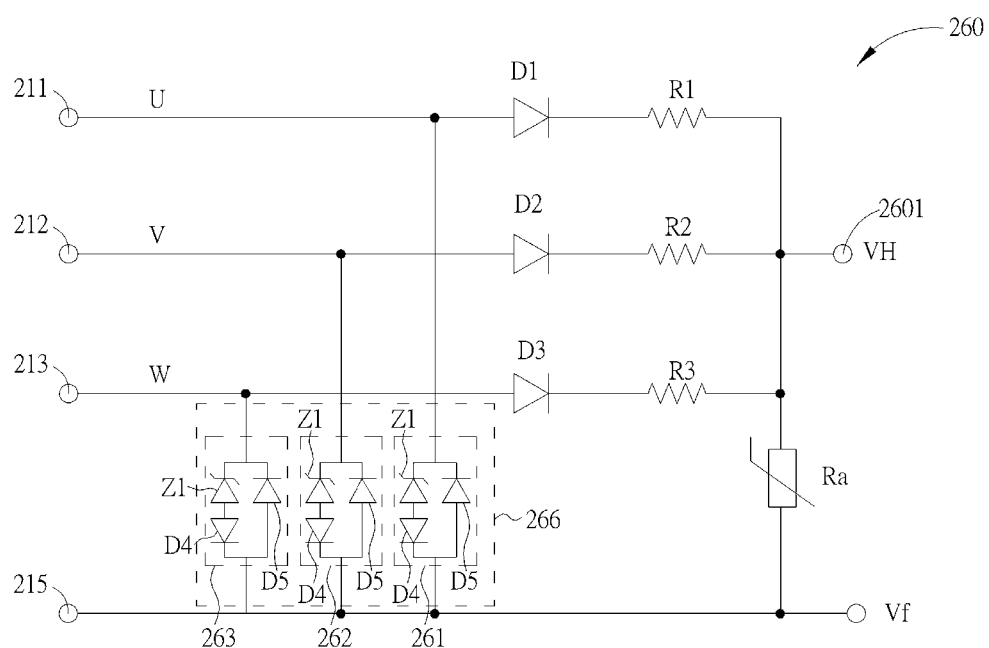
FIG. 5 is a circuit diagram of the rectifier of the BLDC motor in FIG. 2.

Please refer to FIG. 5. FIG. 5 is a circuit diagram of the rectifier 260 of the BLDC motor 200 according to an embodiment of the present invention. The rectifier 260 comprises a first diode D1, a second diode D2 and a third diode D3. An anode of the first diode D1 is coupled to the first input end 211 to receive the first voltage signal U, an anode of the second diode D2 is coupled to the second input end 212 to receive the second voltage signal V, an anode of the third diode D3 is coupled to the third input end 213 to receive the third voltage signal W, and cathodes of the first diode D1, the second diode D2 and the third diode D3 are coupled to the first power supply node 2601.

In another embodiment, the rectifier 260 may further comprise a first resistor R1, a second resistor R2, a third resistor R3 and a varistor Ra. The first resistor R1 is coupled between the cathode of the first diode D1 and the first power supply node 2601. The second resistor R2 is coupled between the cathode of the second diode D2 and the first power supply node 2601. The third resistor R3 is coupled between the cathode of the third diode D3 and the first power supply node 2601. The varistor Ra is coupled between the first power supply node 2601 and the feedback end 215.

In another embodiment, the rectifier 260 may further comprise an electrostatic discharge (ESD) protection circuit 266 for protecting the circuits of the rectifier 260, the buck circuit 270 and the positioning module 240 from ESD damage. The ESD protection circuit 266 comprises a first ESD unit 261, a second ESD unit 262 and a third ESD unit 263. The first ESD unit 261 is coupled between the first input end 211 and the feedback end 215 of the connector 210. The second ESD unit 262 is coupled between the second input end 212 and the feedback end 215 of the connector 210. The third ESD unit 263 is coupled between the third input end 213 and the feedback end 215 of the connector 210. In an embodiment of the present invention, each of the first ESD unit 261, the second ESD unit 262 and the third ESD unit 263 comprises a first Zener diode Z1, a fourth diode D4 and a fifth diode D5. A cathode of the first Zener diode Z1 of the first ESD unit 261 is coupled to the first input end 211, a cathode of the first Zener diode Z1 of the second ESD unit 262 is coupled to the second input end 212, and a cathode of the first Zener diode Z1 of the third ESD unit 263 is coupled to the third input end 213. An anode of each fourth diode D4 is coupled to a corresponding anode of the first Zener diode Z1, and cathodes of the fourth diodes D4 are coupled to the feedback end 215. Anodes of the fifth diodes D5 are coupled to the feedback end 215, and a cathode of each fifth diode D5 is coupled to the cathode of a corresponding first Zener diode Z1.

Figure 6:
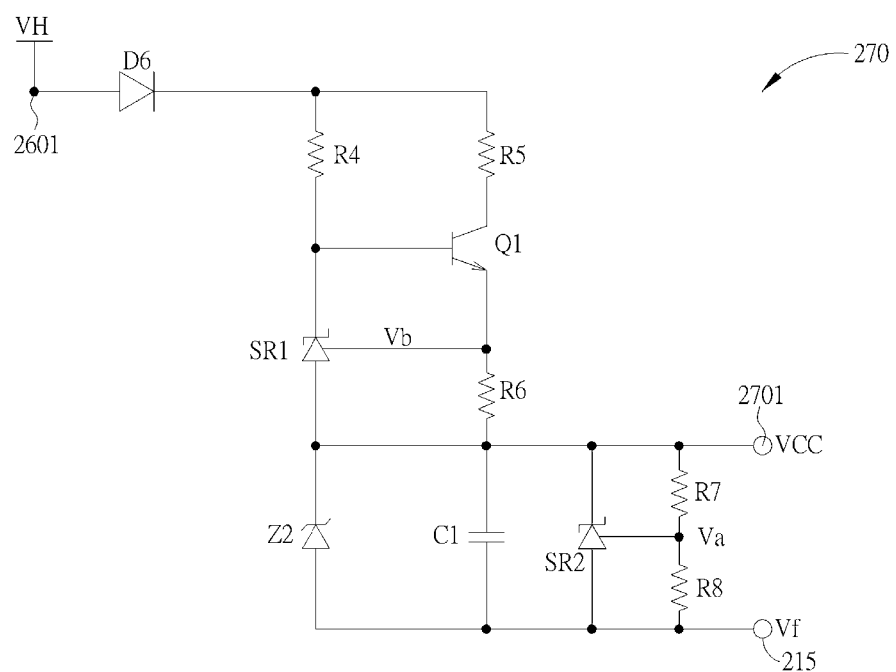
FIG. 6 is a circuit diagram of the buck circuit of the BLDC motor in FIG. 2.

Please refer to FIG. 6. FIG. 6 is a circuit diagram of the buck circuit 270 of the BLDC motor 200 according to an embodiment of the present invention. The buck circuit 270 comprises a sixth diode D6, a fourth resistor R4, a fifth resistor R5, a first bipolar junction transistor (BJT) Q1, a first three-terminal shunt regulator SR1, a sixth resistor R6, a second Zener diode Z2, a first capacitor C1, a second three-terminal shunt regulator SR2, a seventh resistor R7 and an eighth resistor R8. An anode of the sixth diode D6 is coupled to the first power supply node 2601, and a cathode of the sixth diode D6 is coupled to a first end of the fourth resistor R4 and a first end of the fifth resistor R5. A base of the first BJT Q1 is coupled to a second end of the fourth resistor R4, a collector of the first BJT Q1 is coupled to a second end of the fifth resistor R5, and an emitter of the first BJT Q1 is coupled to a first end of the sixth resistor R6. The first three-terminal shunt regulator SR1 and the second three-terminal shunt regulator SR2 may be adjustable reference sources of model CJ431 or CD431 manufactured by Jiangsu Changjiang Electronics Technology Co. Ltd. However, the present invention is not limited thereto. The first three-terminal shunt regulator SR1 and the second three-terminal shunt regulator SR2 may be other three-terminal shunt regulators. In the embodiment, a first end of the first three-terminal shunt regulator SR1 is coupled to the second end of the fourth resistor R4, and a second end of the first three-terminal shunt regulator SR1 is coupled to the second power supply node 2701. A first end of the sixth resistor R6 is coupled to the emitter of the first BJT Q1 and provides a first reference voltage Vb to a reference end of the first three-terminal shunt regulator SR1, and a second end of the sixth resistor R6 is coupled to the second power supply node 2701. A cathode of the second Zener diode Z2 is coupled to the second power supply node 2701, and an anode of the second Zener diode Z2 is coupled to the feedback end 215. The first capacitor C1 is coupled between the second power supply node 2701 and the feedback end 215. A first end of the second three-terminal shunt regulator SR2 is coupled to the second power supply node 2701, and a second end of the second three-terminal shunt regulator SR2 is coupled to the feedback end 215. A first end of the seventh resistor R7 is coupled to the second power supply node 2701, and a second end of the seventh resistor R7 provides a second reference voltage Va to a reference end of the second three-terminal shunt regulator SR2. A first end of the eighth resistor R8 is coupled to the second end of the seventh resistor R7, and a second end of the eighth resistor R8 is coupled to the feedback end 215.

Figure 7:
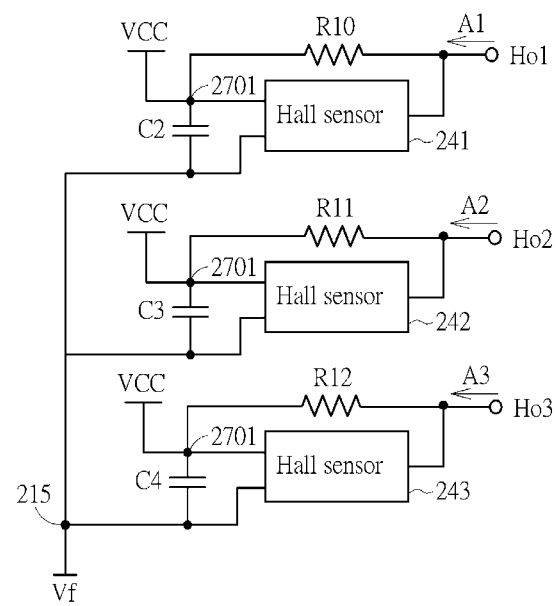
FIG. 7 is a circuit diagram of peripheral circuits related to the three Hall sensors of the BLDC motor in FIG. 2.

Please refer to FIGS. 2, 3 and 7. FIG. 7 is a circuit diagram of peripheral circuits related to the three Hall sensors 241, 242 and 243 of the BLDC motor 200 according to an embodiment of the present invention. The three Hall sensors 241, 242 and 243 are fixed to different positions of the stator 150 via the circuit board 160. Each of the Hall sensors 241, 242 and 243 is coupled between the second power supply node 2701 and the feedback end 215. The positioning module 240 further comprises a tenth resistor R10, a second capacitor C2, an eleventh resistor R11, a third capacitor C3, a twelfth resistor R12 and a fourth capacitor C4. The tenth resistor R10 is coupled between the second power supply node 2701 and the output end Ho1 of the Hall sensor 241. The second capacitor C2 is coupled between the second power supply node 2701 and the feedback end 215. The eleventh resistor R11 is coupled between the second power supply node 2701 and the output end Ho2 of the Hall sensor 242. The third capacitor C3 is coupled between the second power supply node 2701 and the feedback end 215. The twelfth resistor R12 is coupled between the second power supply node 2701 and the output end Ho3 of the Hall sensor 243. The fourth capacitor C4 is coupled between the second power supply node 2701 and the feedback end 215. A voltage difference between the second power supply voltage VCC and the voltage level of the feedback signal Vf is a constant. If it is assumed that the voltage difference between the second power supply voltage VCC and the voltage level of the feedback signal Vf is ΔV, the voltage difference ΔV would be equal to (VCC-Vf), and (VCC-Vf) is constant.

Figure 8:
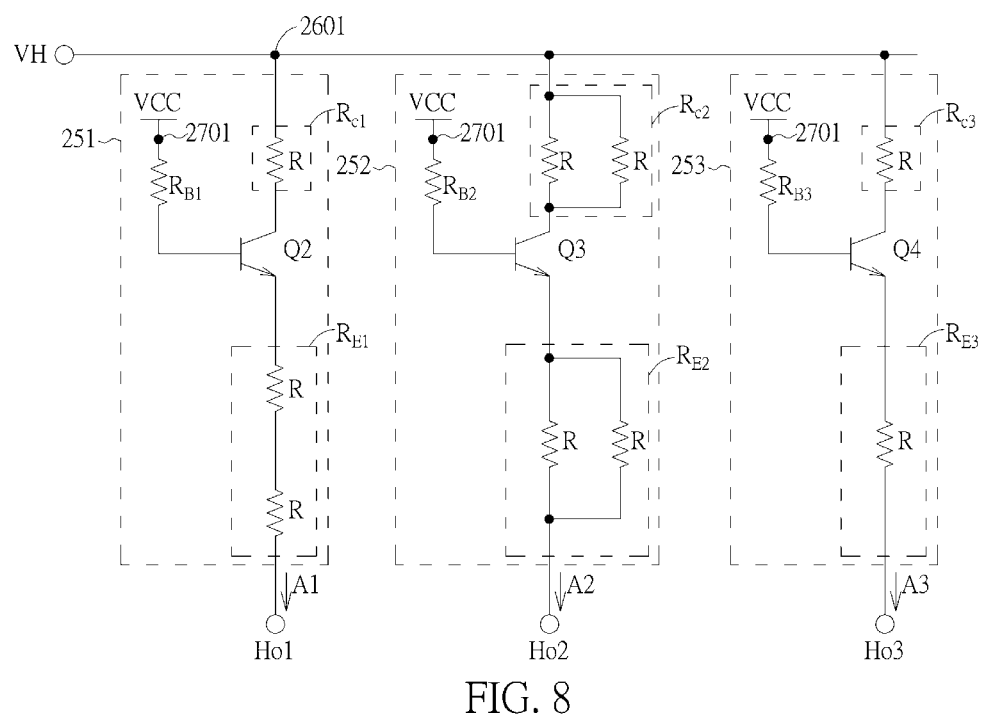
FIG. 8 is a circuit diagram of a first current module, a second current module, and a third current module of the positioning module of the BLDC motor in FIG. 2.

In an embodiment of the present invention, the positioning module 240 may further comprise a first current module 251, a second current module 252, and a third current module 253. Please refer to FIGS. 2 and 8. FIG. 8 is a circuit diagram of the first current module 251, the second current module 252, and the third current module 253 of the positioning module 240 according to an embodiment of the present invention. The first current module 251 is coupled to the first power supply node 2601, the second power supply node 2701 and the output end Ho1 of the Hall sensor 241, and is configured to generate a first current A1 flowing through the output end Ho1 of the Hall sensor 241. The second current module 252 is coupled to the first power supply node 2601, the second power supply node 2701 and the output end Ho2 of the Hall sensor 242, and is configured to generate a second current A2 flowing through the output end Ho2 of the Hall sensor 242. The third current module 253 is coupled to the first power supply node 2601, the second power supply node 2701 and the output end Ho3 of the Hall sensor 243, and is configured to generate a third current A3 flowing through the output end Ho3 of the Hall sensor 243. The first current A1, the second current A2 and the third current A3 have different magnitudes. For example, the second current A2 may be greater than the third current A3, and the third current A3 may be greater than the first current A1.

In the embodiment, the first current module 251 comprises a second BJT Q2, a first collector-bias resistor $R_{C1}$, a first base-bias resistor $R_{B1}$, and a first emitter-bias resistor $R_{E1}$. The first collector-bias resistor $R_{C1}$ has resistance of R and is coupled between the first power supply node 2601 and a collector of the second BJT Q2. The first base-bias resistor $R_{B1}$ also has resistance of R and is coupled between the second power supply node 2701 and a base of the second BJT Q2. The first emitter-bias resistor $R_{E1}$ has resistance of 2 R (i.e., R+R) and is coupled between an emitter of the second BJT Q2 and the output end Ho1 of the Hall sensor 241. The second current module 252 comprises a third BJT Q3, a second collector-bias resistor $R_{C2}$, a second base-bias resistor $R_{B2}$, and a second emitter-bias resistor $R_{E2}$. The second collector-bias resistor $R_{C2}$ has a resistance of 0.5 R (i.e., (R*R)/(R+R)) and is coupled between the first power supply node 2601 and a collector of the third BJT Q3. The second base-bias resistor $R_{B2}$ has a resistance of R and is coupled between the second power supply node 2701 and a base of the third BJT Q3. The second emitter-bias resistor $R_{E2}$ has a resistance of 0.5 R (i.e., (R*R)/(R+R)) and is coupled between an emitter of the third BJT Q3 and the output end Ho2 of the Hall sensor 242. The third current module 253 comprises a fourth BJT Q4, a third collector-bias resistor $R_{C3}$, a third base-bias resistor $R_{B3}$, and a third emitter-bias resistor $R_{E3}$. The third collector-bias resistor $R_{C3}$ has a resistance of R and is coupled between the first power supply node 2601 and a collector of the fourth BJT Q4. The third base-bias resistor $R_{B3}$ has a resistance of R and is coupled between the second power supply node 2701 and a base of the fourth BJT Q4. The third emitter-bias resistor $R_{E3}$ has a resistance of R and is coupled between an emitter of the fourth BJT Q4 and the output end Ho3 of the hall sensor 243. In the embodiment, the first current A1, the second current A2 and the third current A3 have a ratio of 1:4:2.

When the BLDC motor 200 operates, the rotor 170 rotates around the stator 150, and the positions of the magnets 172 of the rotor 170 are changed accordingly. When one of the magnets 172 passes by a corresponding Hall sensor 241, 242 or 243 of the positioning module 240, the corresponding current A1, A2 or A3 is generated and flows into the corresponding Hall sensor. However, when none of the magnets 172 passes by a corresponding Hall sensor 241, 242 or 243 of the positioning module 240, the corresponding current A1, A2 or A3 would not be generated. For example, when one of the magnets 172 passes by the Hall sensor 241, the current A1 is generated and flows into the Hall sensor 241. When none of the magnets 172 passes by the Hall sensor 241, the current A1 would not be generated. Accordingly, voltage levels of output ends Ho1, Ho2 and Ho3 of the three Hall sensors 241, 242 and 243 could be determined according to the magnitudes of the currents A1, A2 and A3 so as to determine the positions of the magnets 172. Moreover, since a voltage level of the feedback signal Vf would be changed due to the variations of the voltage levels of output ends Ho1, Ho2 and Ho3 of the three Hall sensors 241, 242 and 243, the positions of the magnets 172 could be determined by the controller 290 according to the feedback signal Vf. As a result, a single wire 225 is sufficient to transmit information of positions of the plurality of magnets 172 to the controller 290. Therefore, the controller 290 would adjust the three voltage signals U, V and W according to the feedback signal Vf so as to control the speed and torque of the BLDC motor 200.

In an embodiment of the present invention, the controller 290 may comprise a sampling resistor Rd. The sampling resistor Rd is coupled between the feedback end 215 and a ground voltage GND (i.e., 0 volt). A current I flowing through the sampling resistor Rd is equal to the sum of the currents A0, A1, A2 and A3. Therefore, the voltage level of the feedback signal Vf could be determined according to the resistance of the sampling resistor Rd and the sum of the currents A0, A1, A2 and A3. With more specific detail, the voltage level of the feedback signal Vf could be represented by the following equation:

$$Vf = Rd \times I = Rd \times (A0 + A1 + A2 + A3) \qquad (1)$$

Since each of the currents A1, A2 and A3 is generated and flows into a corresponding Hall sensor 241, 242 or 243 when one of the magnets 172 passes by the corresponding Hall sensor 241, 242 or 243, the voltage level of the feedback signal Vf would be changed based on the positions of the magnets 172. Therefore, the controller 290 cloud adjust the three voltage signals U, V and W according to the feedback signal Vf so as to control the speed and torque of the BLDC motor 200.

In an embodiment of the present invention, the controller 290 may further comprise an analog to digital converter (ADC) 292 configured to convert the voltage level of the feedback signal Vf to a digital signal Sd, and the controller 290 may adjust the three voltage signals U, V and W according to the digital signal Sd so as to control the speed and torque of the BLDC motor 200.

Figure 9:
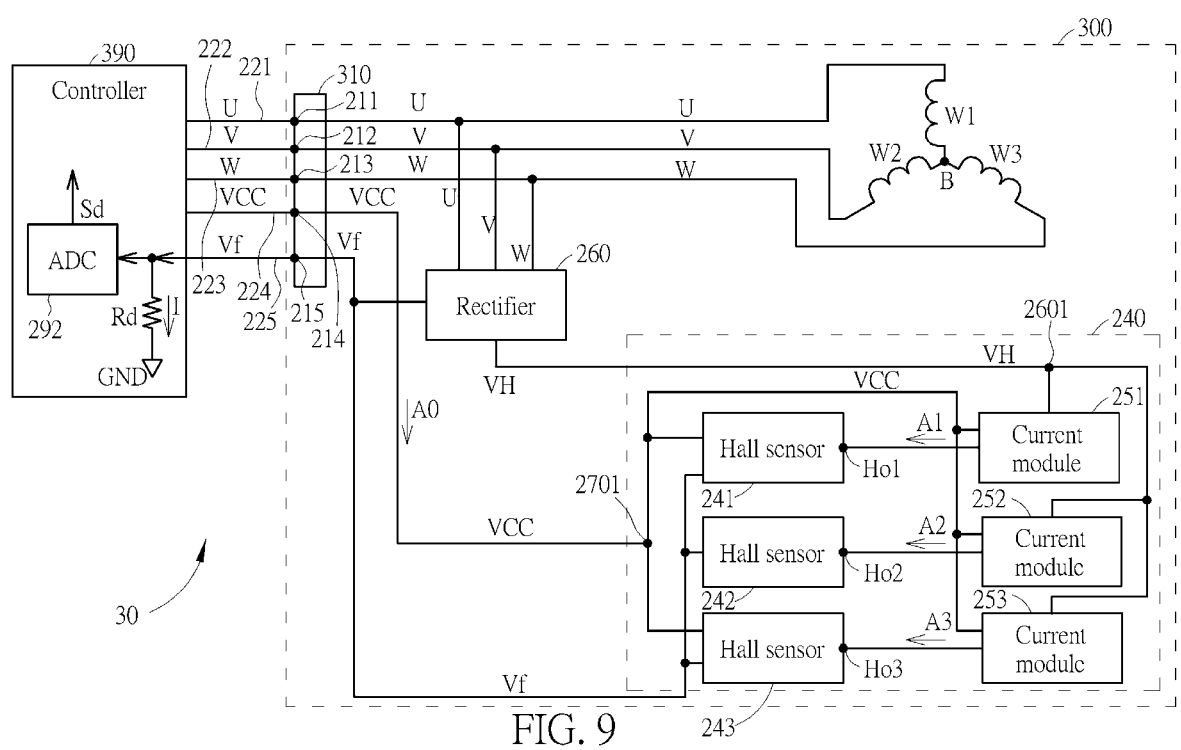
FIG. 9 shows electronic connections of a BLDC motor and a controller of a motor system according to another embodiment of the present invention.

In an embodiment of the present invention, the second power supply voltage VCC may be directly provided to the motor by the controller. Please refer to FIG. 9. FIG. 9 shows electronic connections of a BLDC motor 300 and a controller 390 of a motor system 30 according to another embodiment of the present invention. The main difference between the two motor systems 20 and 30 is that the second power supply voltage VCC and the quiescent current A0 are directly provided to the BLDC motor 300 of the motor system 30 by the controller 390 of the motor system 30. Since the quiescent current A0 is constant, the controller 290 may further comprise a current source for generating the quiescent current A0. In addition, the connector 210 of the BLDC motor 200 in FIG. 2 is replaced by the connector 310 of the BLDC motor 300 in FIG. 9, and the BLDC motor 300 would operate normally without the buck circuit 270 in FIG. 2. As compared with the connector 210 in FIG. 2, the connector 310 further comprises a fourth input end 214 for receiving the second power supply voltage VCC from the controller 390 via a wire 224.

As compared with the motor system 10 of the prior art, the motor system 30 only uses the five wires 221, 222, 223, 224 and 225 to electrically connect the BLDC motor 300 to the controller 390, and the BLDC motor 300 uses a single wire 225 to transmit information of positions of the plurality of magnets 172 to the controller 290. Therefore, when the motor system 30 is used in a motorized suitcase, it would be easier to contain all of the five wires 221 to 225 to a small-sized wheel of the motorized suitcase, which is equipped with and driven by the BLDC motor 300, while the controller 390 is not installed in the small-sized wheel of the motorized suitcase.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A brushless direct-current (BLDC) motor, comprising:
   a connector, comprising:
      a first input end for receiving a first voltage signal;
      a second input end for receiving a second voltage signal;
      a third input end for receiving a third voltage signal; and
      a feedback end for receiving a feedback signal, wherein the first voltage signal, the second voltage signal and the third voltage signal are adjusted according to the feedback signal;
   a stator, comprising:
      a first winding for receiving the first voltage signal;
      a second winding for receiving the second voltage signal; and
      a third winding for receiving the third voltage signal;
   a rotor, comprising a plurality of magnets, wherein rotation of the rotor is induced by interaction of magnetic fields of the first winding, the second winding, the third winding and the plurality of magnets; and
   a positioning module, fixed to the stator, comprising three Hall sensors for sensing positions of the plurality of magnets, and configured to generate the feedback signal according to the positions of the plurality of magnets sensed by the three Hall sensors;
   wherein a voltage level of the feedback signal is determined according to voltage levels of output ends of the three Hall sensors; and
   wherein the three Hall sensors are a first Hall sensor, a second Hall sensor and a third Hall sensor fixed to different positions of the stator, and the positioning module further comprises:
      a first current module, coupled to a first power supply node, a second power supply node and an output end of the first Hall sensor, and configured to generate a first current flowing through the output end of the first Hall sensor;
      a second current module, coupled to the first power supply node, the second power supply node and an output end of the second Hall sensor, and configured to generate a second current flowing through the output end of the second Hall sensor; and
      a third current module, coupled to the first power supply node, the second power supply node and an output end of the third Hall sensor, and configured to generate a third current flowing through the output end of the third Hall sensor.

2. The BLDC motor of claim 1, wherein the first current, the second current and the third current have different magnitudes.

3. The BLDC motor of claim 1, wherein each of the first Hall sensor, the second Hall sensor and the third Hall sensor is coupled between the second power supply node and the feedback end.

4. The BLDC motor of claim 1, wherein the first current module comprises:
   a second bipolar junction transistor (BJT);
   a first collector-bias resistor, coupled between the first power supply node and a collector of the second BJT;
   a first base-bias resistor, coupled between the second power supply node and a base of the second BJT; and a first emitter-bias resistor, coupled between an emitter of the second BJT and the output end of the first Hall sensor;
wherein the second current module comprises:
a third BJT;
a second collector-bias resistor, coupled between the first power supply node and a collector of the third BJT;
a second base-bias resistor, coupled between the second power supply node and a base of the third BJT; and
a second emitter-bias resistor, coupled between an emitter of the third BJT and the output end of the second Hall sensor; and
wherein the third current module comprises:
a fourth BJT;
a third collector-bias resistor, coupled between the first power supply node and a collector of the fourth BJT;
a third base-bias resistor, coupled between the second power supply node and a base of the fourth BJT; and
a third emitter-bias resistor, coupled between an emitter of the fourth BJT and the output end of the third hall sensor.

5. The BLDC motor of claim 1, wherein the positioning module further comprises:
a tenth resistor, coupled between the second power supply node and the output end of the first Hall sensor;
a second capacitor, coupled between the second power supply node and the feedback end;
an eleventh resistor, coupled between the second power supply node and the output end of the second Hall sensor;
a third capacitor, coupled between the second power supply node and the feedback end;
a twelfth resistor, coupled between the second power supply node and the output end of the third Hall sensor; and
a fourth capacitor, coupled between the second power supply node and the feedback end.

6. The BLDC motor of claim 1 further comprising:
a rectifier, configured to rectify the first voltage signal, the second voltage signal and the third voltage signal to output a first power supply voltage to the first power supply node; and
a buck circuit, coupled between the first power supply node and the feedback end, and configured to generate a second power supply voltage based on the first power supply voltage, wherein the second power supply voltage is less than the first power supply voltage and is outputted to the second power supply node.

7. The BLDC motor of claim 6, wherein the rectifier comprises:
a first diode, an anode of the first diode being coupled to the first input end to receive the first voltage signal, and a cathode of the first diode being coupled to the first power supply node;
a second diode, an anode of the second diode being coupled to the second input end to receive the second voltage signal, and a cathode of the second diode being coupled to the first power supply node; and
a third diode, an anode of the third diode being coupled to the third input end to receive the third voltage signal, and a cathode of the third diode being coupled to the first power supply node.

8. The BLDC motor of claim 7, wherein the rectifier further comprises:
a first resistor, coupled between the cathode of the first diode and the first power supply node;
a second resistor, coupled between the cathode of the second diode and the first power supply node;
a third resistor, coupled between the cathode of the third diode and the first power supply node; and
a varistor coupled between the first power supply node and the feedback end.

9. The BLDC motor of claim 7, wherein the rectifier further comprises an electrostatic discharge (ESD) protection circuit, the ESD protection circuit comprising:
a first ESD unit, coupled between the first input end of the connector and the feedback end of the connector;
a second ESD unit, coupled between the second input end of the connector and the feedback end of the connector; and
a third ESD unit, coupled between the third input end of the connector and the feedback end of the connector.

10. The BLDC motor of claim 9, wherein each of the first ESD unit, the second ESD unit and the third ESD unit comprises:
a first Zener diode, a cathode of the first Zener diode being coupled to a corresponding one of the first input end, the second input end and the third input end of the connector;
a fourth diode, an anode of the fourth diode being coupled to an anode of the first Zener diode, and a cathode of the fourth diode being coupled to the feedback end; and
a fifth diode, an anode of the fifth diode being coupled to the feedback end, and a cathode of the fifth diode being coupled to the cathode of the first Zener diode.

11. The BLDC motor of claim 6, wherein the buck circuit comprises:
a sixth diode, an anode of the sixth diode being coupled to the first power supply node;
a fourth resistor, a first end of the fourth resistor being coupled to a cathode of the sixth diode;
a fifth resistor, a first end of the fifth resistor being coupled to the cathode of the sixth diode;
a first bipolar junction transistor (BJT), a base of the first BJT being coupled to a second end of the fourth resistor, and a collector of the first BJT being coupled to a second end of the fifth resistor;
a first three-terminal shunt regulator, a first end of the first three-terminal shunt regulator being coupled to the second end of the fourth resistor, and a second end of the first three-terminal shunt regulator being coupled to the second power supply node;
a sixth resistor, a first end of the sixth resistor being coupled to an emitter of the first BJT and providing a first reference voltage to a reference end of the first three-terminal shunt regulator, and a second end of the sixth resistor being coupled to the second power supply node;
a second Zener diode, a cathode of the second Zener diode being coupled to the second power supply node, and an anode of the second Zener diode being coupled to the feedback end;
a first capacitor, coupled between the second power supply node and the feedback end;
a second three-terminal shunt regulator, a first end of the second three-terminal shunt regulator being coupled to the second power supply node, and a second end of the second three-terminal shunt regulator being coupled to the feedback end;
a seventh resistor, a first end of the seventh resistor being coupled to the second power supply node, and a second end of the seventh resistor providing a second reference voltage to a reference end of the second three-terminal shunt regulator; and an eighth resistor, a first end of the eighth resistor being coupled to the second end of the seventh resistor, and a second end of the eighth resistor being coupled to the feedback end.

12. The BLDC motor of claim 1 further comprising:

a rectifier, configured to rectify the first voltage signal, the second voltage signal and the third voltage signal to output a first power supply voltage to the first power supply node;

wherein the connector further comprises:

a fourth input end for receiving a second power supply voltage to the second power supply node, wherein the second power supply voltage is less than the first power supply voltage.

13. The BLDC motor of claim 12, wherein the rectifier comprises:

a first diode, an anode of the first diode being coupled to the first input end to receive the first voltage signal, and a cathode of the first diode being coupled to the first power supply node;

a second diode, an anode of the second diode being coupled to the second input end to receive the second voltage signal, and a cathode of the second diode being coupled to the first power supply node; and a third diode, an anode of the third diode being coupled to the third input end to receive the third voltage signal, and a cathode of the third diode being coupled to the first power supply node.

14. The BLDC motor of claim 13, wherein the rectifier further comprises:

a first resistor, coupled between the cathode of the first diode and the first power supply node;

a second resistor, coupled between the cathode of the second diode and the first power supply node;

a third resistor, coupled between the cathode of the third diode and the first power supply node; and a varistor coupled between the first power supply node and the feedback end.

15. The BLDC motor of claim 13, wherein the rectifier further comprises an electrostatic discharge (ESD) protection circuit, the ESD protection circuit comprising:

a first ESD unit, coupled between the first input end of the connector and the feedback end of the connector;

a second ESD unit, coupled between the second input end of the connector and the feedback end of the connector); and a third ESD unit, coupled between the third input end of the connector and the feedback end of the connector.

16. The BLDC motor of claim 15, wherein each of the first ESD unit, the second ESD unit and the third ESD unit comprises:

a first Zener diode, a cathode of the first Zener diode being coupled to a corresponding one of the first input end, the second input end and the third input end of the connector;

a fourth diode, an anode of the fourth diode being coupled to an anode of the first Zener diode, and a cathode of the fourth diode being coupled to the feedback end; and a fifth diode, an anode of the fifth diode being coupled to the feedback end, and a cathode of the fifth diode being coupled to the cathode of the first Zener diode.

17. The BLDC motor of claim 1 further comprising an analog to digital converter (ADC) configured to convert a voltage level of the feedback signal to a digital signal, wherein the first voltage signal, the second voltage signal and the third voltage signal are adjusted according to the digital signal.

* * * * *